No. 607,216. Patented July 12, 1898.
T. CASWELL.
COMBINED HAY RAKE AND BALING PRESS.
(Application filed July 22, 1897.)
(No Model.) 5 Sheets—Sheet 4.
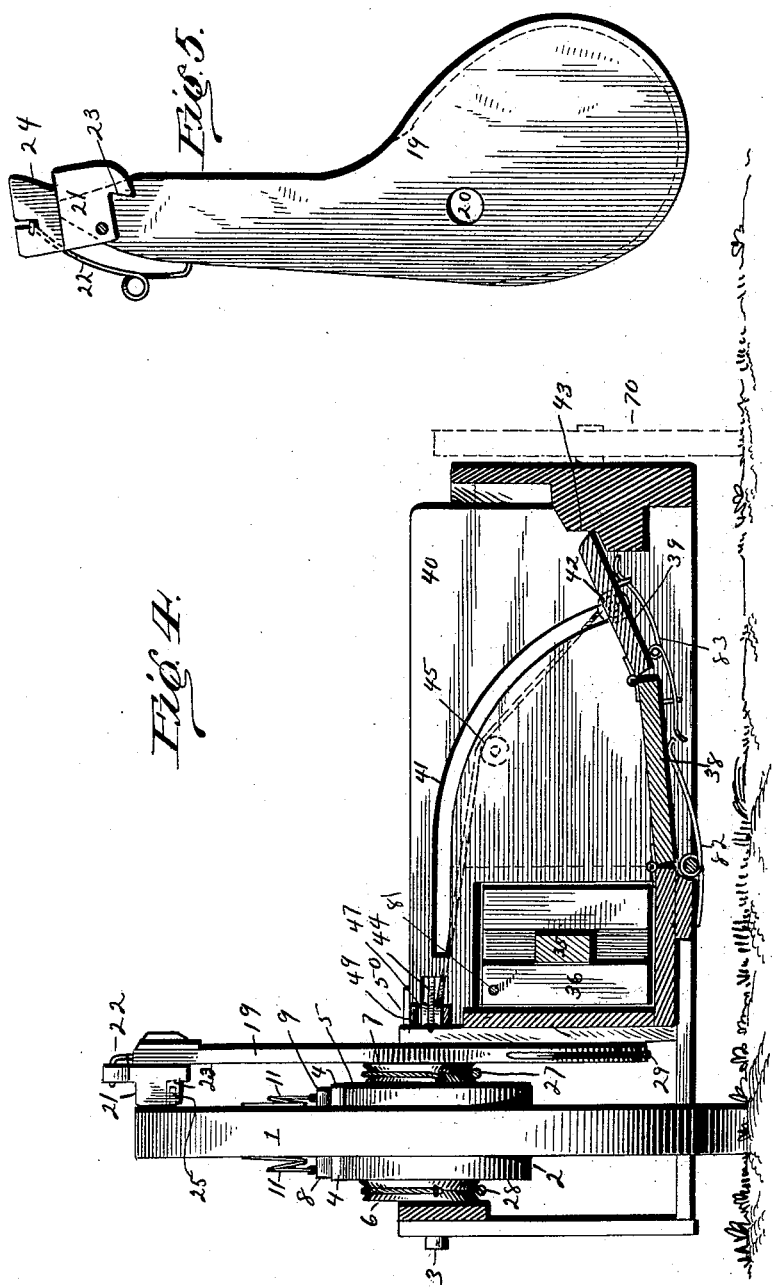
Witnesses:
L. C. Hills
W. A. Roberts
Inventor:
Thomas Caswell
By Glascock &co.
Atty's.

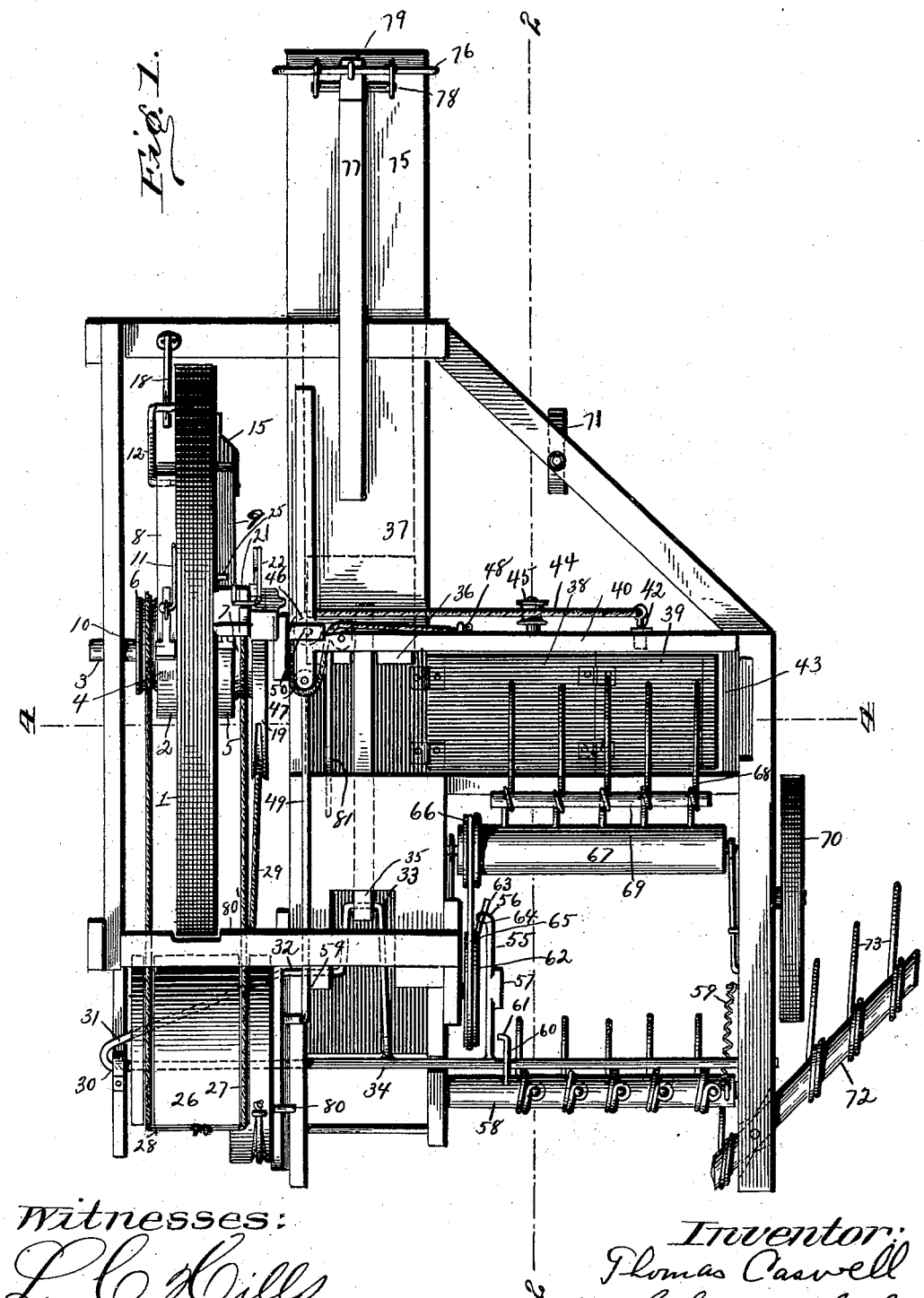

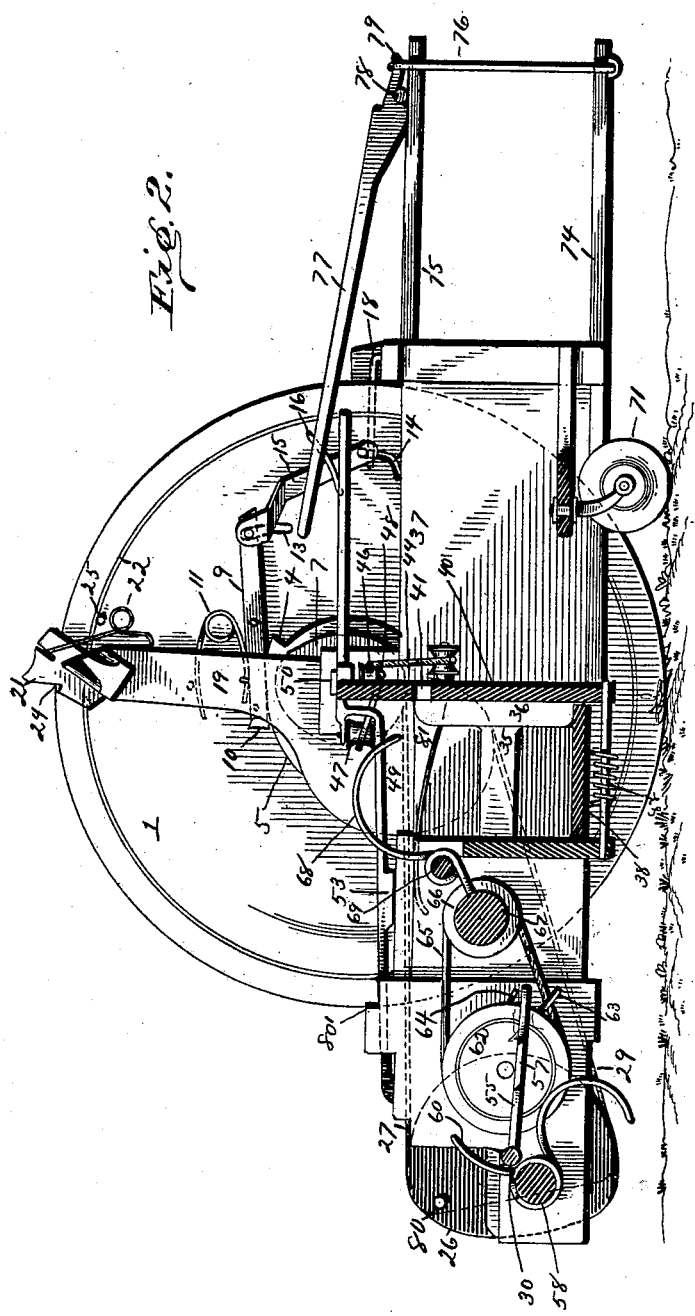

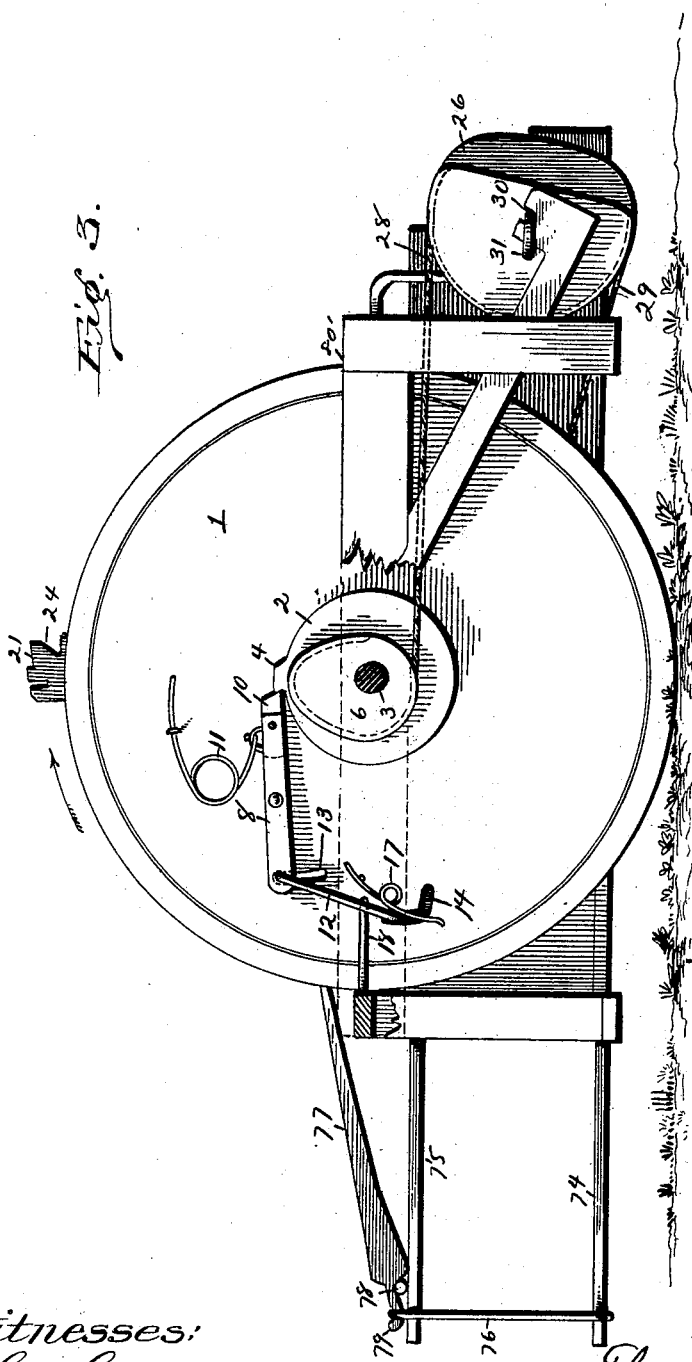

No. 607,216. Patented July 12, 1898.
T. CASWELL.
COMBINED HAY RAKE AND BALING PRESS.
(Application filed July 22, 1897.)
(No Model.) 5 Sheets—Sheet 5.
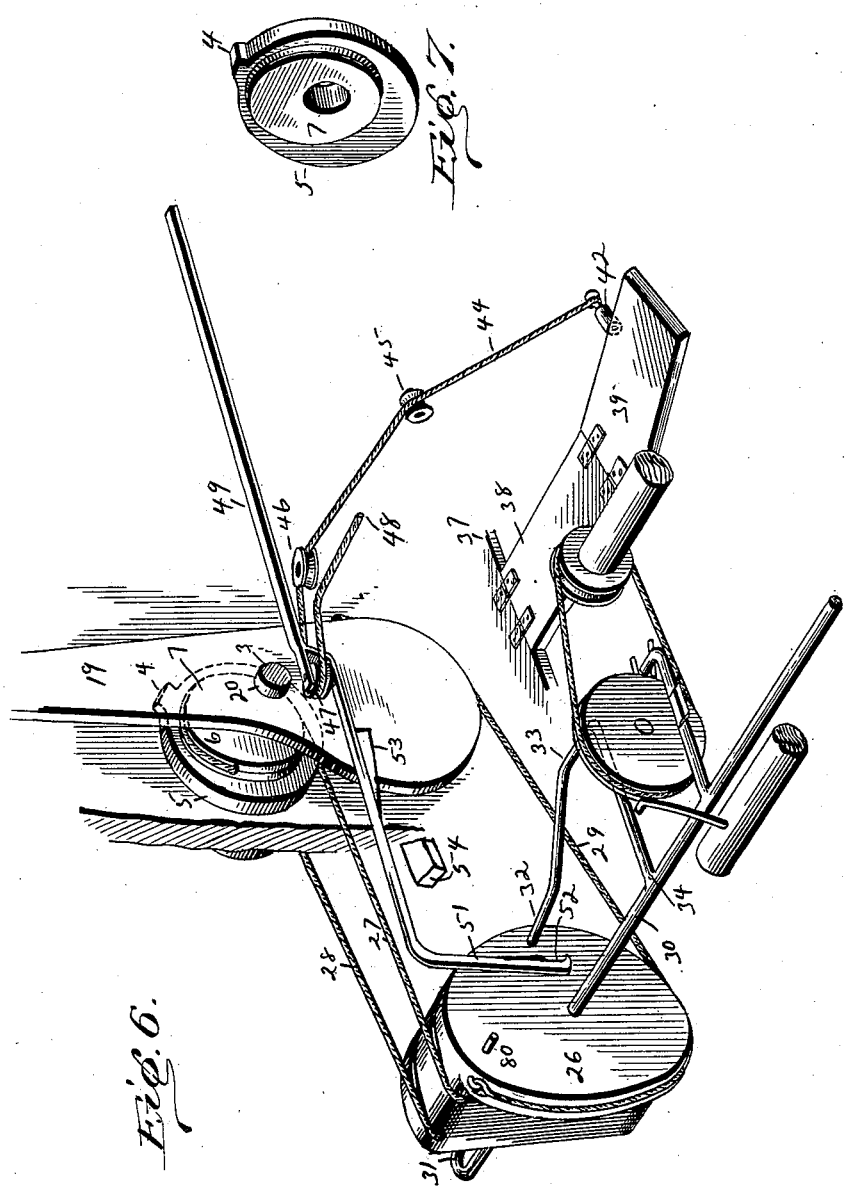
Witnesses:
L. C. Hills.
W. T. Roberts.
Inventor:
Thomas Caswell
By Glascock & ler
Atty's.

United States Patent Office.

THOMAS CASWELL, OF CHEROKEE, IOWA.

COMBINED HAY-RAKE AND BALING-PRESS.

SPECIFICATION forming part of Letters Patent No. 607,216, dated July 12, 1898.

Application filed July 22, 1897. Serial No. 645,543. (No model.)

*To all whom it may concern:*

Be it known that I, THOMAS CASWELL, a citizen of the United States, residing at Cherokee, in the county of Cherokee and State of Iowa, have invented a certain new, useful, and valuable Improvement in a Combined Hay-Rake and Baling-Press, of which the following is a full, clear, and exact description.

My invention has relation to combined hay-rakes and baling-presses; and it consists in the novel construction and arrangement of its parts, as hereinafter described.

The object of the invention is to rake the hay from the ground and deposit it upon open folding sections of the baling-press and then closing said sections, pressing the hay in the interior of the baling-press, and forcing in a plunger to further press the hay and pass it toward the end of the machine. At the end of the machine the bale may be tied up with suitable bale-ties, or it may be deposited in the form of a bundle on the ground.

The further object of the invention is to provide a single traction-wheel which is provided with suitable appliances whereby the power is transmitted from the one traction-wheel to all of the moving parts of the machine.

The further object of the invention is to provide the simplest and most practical means for accomplishing the results stated.

In the accompanying drawings, Figure 1 is a top plan view of the machine. Fig. 2 is a longitudinal section cut on the line 2 2 of Fig. 1. Fig. 3 is a side elevation, partly in section. Fig. 4 is a transverse sectional view cut on the line 4 4 of Fig. 1. Fig. 5 is a side elevation of a cam-lever used on the machine. Fig. 6 is a perspective diagram view of the mechanism for operating the rakes and the folding sections of the side of the press, the framework of the machine being removed. Fig. 7 is a perspective view of a cam used on each side of the driving-wheel.

The driving-wheel 1 is mounted on the axle 3, the said axle being journaled in the framework of the machine. The disk 2 is mounted concentrically and loosely on the axle 3 of the driving-wheel 1 and has on its periphery a projection 4. A similar disk 5 is arranged on the opposite side of the driving-wheel 1 in a similar manner to that of disk 2. The disks 2 and 5 have the eccentric disks 6 and 7 attached to their outer sides, said eccentric disks having openings therethrough for receiving the axle 3.

The dogs 8 and 9 are pivoted on opposite sides of the face of the driving-wheel. The points 10 are pivotally attached to the inner ends of the dogs 8 and 9, each dog having at its inner end a pivotal point 10. The spring 11 is confined at one end on the side of the wheel 1, and at the other end engages the shank of the point 10 of the dog. It is the function of the springs 11 to normally retain the pivotal points 10 in close proximity to the peripheries of the disks 2 and 5. The outer ends of the dogs 8 and 9 are connected by the link 12, the upper end thereof passing through the perforation 13 in the traction-wheel 1, and the lower end passing through the angular perforation 14 in the traction-wheel 1 and connecting on the side of the traction-wheel 1 next the baling-press with a flat strip of metal 15, constituting a part of said link, as shown in Fig. 2, said strip of metal passing under the guide 16 and being formed as shown in Fig. 2. A spring 17 (see Fig. 3) is secured at one end to the side of the traction-wheel 1 and bears against the lower end of the link 12, thus normally retaining the lower end of the link 12 in the angular extension of the perforation 14.

A trip 18 is fixed at one end to the framework of the machine, the free end of said trip being adapted to pass between the link 12 and the said driving-wheel 1, and as the said wheel revolves the lower end of the link is adapted to come in contact with the end of the trip, as indicated in Fig. 3, and cause it to enter the angular extension of the perforation 14. At the same time the upper ends of the dogs 8 and 9 and the points 10 of the dogs disengage the projections 4 4 on the peripheries of the disks 2 and 5, the object of which will be hereinafter explained. By pivotally connecting the points 10 10 to the dogs 8 and 9 the points will buckle sufficiently—that is, move out of alinement with the dogs—to permit the said points to disengage the projections 4 4. A cam-lever 19 is mounted upon the axle 3, said cam-lever being located between the eccentric 7 and the framework of the machine, as shown in Fig. 4. The upper end of said lever is provided with a pivoted block 21, a spring 22 being fixed at one end to said block and at the other end to the lever. The lower side of said block is provided with a notch 23, and the upper edge of the block is provided with a notch 24. The side of the driving-wheel is provided with a projection or peg 25. As the wheel 1 revolves the peg 25 enters the notch 23 and carries the upper end of the lever 19 around, as will be hereinafter explained.

The eccentric drum 26 is journaled at the forward end of the machine, the cords 27 and 29 being secured at their forward ends to the periphery of the drum 26 and passing over the top thereof. The rear ends of said cords are attached to the eccentrics 6 and 7, respectively. The cord 29 is also secured to the periphery of the drum 26 at its forward end, said cord passing under the drum and being secured at its rear end to the lower end of the cam-lever 19, as indicated in Fig. 2. The drum 26 is rigidly fixed to the shaft 30, said shaft extending across the machine, as shown in Fig. 1, and bent at its outer end, so as to form a section 31, which passes substantially diagonally through the drum 26, as shown in Fig. 1, and terminates in a parallel section 32. The opposite end of the parallel section 32 connects with the crank-arm of the section 33, the end of which is secured at the point 34 with the shaft 30, intermediate its length. The forward end of the pitman 35 is journaled to the crank-arm 33, and to the rear end of said pitman is journaled the plunger 36, said plunger being adapted to reciprocate back and forth within the press-box 37.

The press-box 37 is provided on one side with folding sections 38 and 39, said sections being hinged together, as shown in Fig. 4. The said sections when in the positions as indicated by the dotted lines in Fig. 4 are adapted to form portions of the side and top of the press-box 37. The heavy lines in the said figure show the said sections 38 and 39 extended or open ready to receive the deposit of hay. The partition 40 is located back of the rear edges of the folding sections 38 and 39, said partition having a curved slot or recess 41, adapted to receive a projection 42, located at the edge of the section 39.

The recessed block 43 is located at the side of the framework of the machine and is adapted to receive the outer edge of the section 39 and support the same. When the sections 38 and 39 are in the positions as shown in Fig. 4, the cord 44 is fastened at one end to the projection 42, carried by the folding section 39, and thence passes over the pulley 45, journaled on a pintle attached to the partition 40, and thence around a pulley 46, (see Fig. 1,) journaled through the top of the press-box 37, and thence around the pulley 47, and is carried back and secured at the point 48 to the side of the partition 40. The pulley 47 is journaled in a reciprocating arm 49, which passes under the guide 50, and at its forward ends is provided with the downward extension 51, terminating in a hook 52 at the lower end thereof. The under side of the arm 49 is provided with the projection 53, said projection being adapted when the arm is at its farthest position forward to engage the offset 54, formed at the forward end of the press-box 37.

The parallel section 32 of the shaft 30 is adapted to work between the downward extension 51 of the arm 54 and the projection 53. An arm 55 is attached at one end to the shaft 30, said arm having at its rear end the angular extension 56, and at an intermediate point of the said arm the offset 57 is located.

The revolving rake-bar 58 is journaled in the forward part of the machine. The teeth of the said rake consist of the wire rods secured at one end to the bar and wound about the bar, the lower ends of the said rods extending downwardly and adapted to rake the hay from the ground. The revolving bar 58 is provided with the spring 59, which is adapted to keep the teeth in their proper positions when raking the hay from the ground. The bar 58 is also provided with an arm 60, said arm 60 having at its inner end the angular extension 61, said extension 61 entering the path of the offset 57, as will be hereinafter explained. The pulley-wheel 62 is journaled to the said frame behind the rake-bar 58. Said pulley 62 has on its periphery the long projection 63 and the short projection 64, the said projections being preferably mounted at an angle to the diameter of the pulley, as shown in Fig. 2, and having a suitable intervening space between them. The belt-cord 65 surrounds the pulley 62 and the pulley 66, said pulley 66 being permanently fixed to the revolving rake-bar 67, said rake-bar 67 being parallel to the rear bar 58. The teeth 68 of the bar 67 consist of wire rods, said rods being secured at one end lengthwise of the bar 67, said bar being adapted to revolve. The teeth are then curved at intermediate points about the bar 69. The teeth are thus braced and are adapted to lift the hay and deposit it in the extended sections 38 and 39, as indicated in Fig. 2.

The wheel 70 supports the opposite side of the machine from the wheel 1, the axis of the wheel 71 supporting the rear end of the machine. The rake-bar 72 is located in front of the wheel 70, said rake-bar having suitable teeth 73, said teeth being adapted to remove the hay in front of the wheel 70, thus making a clear track for the wheel 70 to run upon. When the teeth 73 have collected all of the hay that they can hold, the remaining hay as it is collected forces the hay at the upper portions of the said teeth off at the ends of the bar 73. Thus room is made on the teeth for the hay as it is collected.

The bar 72 is pivotally connected to the frame of the machine, as indicated in Fig. 1, the said bar being slanted toward the rear, and thus the teeth slant, and most of the hay collected by the teeth is thus thrown toward the rear end of the bar 73—that is, it is shunted to one side—and thus leaving a trail of hay at one side of the machine which is caught up and folded by the machine in its next course around the field.

The rear end of the press-box 37 is minus its side walls—that is, the extreme rear end consists of the bottom piece 74 and the top piece 75. A metallic loop 76 is attached at its lower side to the said bottom 74, the upper portion of the loop passing over the top piece 75. A lever 77 is adapted to operate on top of the piece 75, as indicated in Fig. 2, the cross-rod 78 serving as a fulcrum-point for the said lever 77, the end of the said lever being notched, as at 79, and adapted to pass under the upper portion of the link 76, and thus the outer ends of the top piece 75 and the bottom piece 74 may be drawn together, the object of which will be hereinafter explained.

As the machine passes over the ground the wheel 1 revolves, the teeth on the bar 58 collect the hay, and the points 10 of the dogs 8 and 9 engage the projections 4 of the disks 2 and 5. Thus the said disks are held stationary with the wheel 1, and as the disks are carried around the cords 27 and 28 are drawn and the drum 26 is turned from right to left. This causes the shaft 30 to turn in the same direction, and the crank-arm 33, through the pitman 35, forces the plunger 36 in the rear portion of the press-box 37. Thus any hay that is in the said press-box 37 is pressed and passed toward the rear end of said box. When the wheel 1 revolves far enough to bring the link 12 in contact with the trip 18, the trip depresses the link and causes the points 10 10 of the arms 8 and 9 to disengage the projections 4, and thus the disks 2 and 5 are disengaged from the wheel 1, the said disks 2 and 5 being loose on the axle 3. At the same time that the trip 18 engages the link 12 the projection 25 enters the recess 23 of the cam-lever 19. Thus the cam-lever 19 is made stationary with the wheel 1, and the said cam-lever is carried around with the said wheel. The cord attached to the lower end of the cam-lever draws the drum 26 around from left to right, and the crank-lever 33, through the pitman 35, draws the plunger 36 toward the front portion of the press-box 37. At the same time the parallel section 32 of the shaft 33 engages the downward-extending section 51 of the arm 49, and thus the said arm 49 is drawn forward until the projection engages the offset 54. At the time that the arm 49 is passing forward the cord 44 is drawn toward the front of the machine, and the open sections 38 and 39 are thus closed, the hay having been previously deposited on said sections, as will be hereinafter explained. As the sections close the hay is bundled up in the interior of the press-box 37, the plunger having been withdrawn to the forward part of the machine. As the shaft 30 turns from left to right the offset 57 is brought in contact with the extension 61 of the rod 60. This causes the tooth-bar 58 to revolve from left to right, and thus carry the teeth attached to said bar to the rear and upward, thus depositing the hay that has been collected by the teeth of the bar 58 upon the teeth 68, the last said teeth being in proper position to receive the hay. When the cam-lever 19 has been carried around and is substantially in a horizontal position, the notch 24 strikes the framework of the machine at the point 80", and the block 21 is caused to turn, and thus the projection 25 is disengaged from the notch 23, the cam-lever 19 thus being disconnected from the wheel 1. At the same time the points 10 10 engage the projections 4 4 of the disks 2 and 5, and thus the said disks are held stationary with the wheel 1, and the drum 26 turns from right to left, as has been before stated, and thus the shaft 30 is turned in the same direction. This permits the teeth on the bar 58 to assume their normal positions, being drawn to such positions by means of the spring 59, and at the same time the angular extension 56 of the arm 55 passes in the space between the projections 64 and 63. The extension 56 coming in contact with the projection 63 causes the pulley 62 to turn, and the belt-cord 65, passing around the pulleys 62 and 66, causes the bar 67 to turn, as indicated in Fig. 2. Thus the hay is deposited from the teeth 68 upon the open sections 38 and 39. As the drum 26 turns from right to left the lug 80, attached to the side of said drum, engages the lower portion of the downward extension 51 of the arm 49 and lifts the projections 53 above the offset 54, and the springs 82 and 83 or the folding sections 38 and 39 cause the said sections to open. The said sections are opened before the hay is deposited thereon from the teeth 68. After the hay has been deposited upon said sections the drum 26 is turned from right to left, and the hay is carried up by the folding sections and pressed in the forward portion of the press-box 36. The plunger 38 then passes to the rear and forces the hay in the rear portion of the press-box 37. The spring 81 is attached to the plunger 36 at one end, the said spring extending up at its lower end and coming in contact with the under side of the top of the press-box, and thus tending to keep the washer against the bottom of the box. When the hay is pressed or forced out of the press-box, it may be secured in bales by suitable ties, the contraction of the outer ends of the portions 74 and 75 causing the hay to be tightly pressed therein. Thus the hay is baled.

If it is desired simply to deposit the hay from the machine in bundles without compressing or tying them, the lever 77 is removed and the hay will pass from the machine in such semicompressed bundles.

Having described my invention, what I claim as new, and desire to secure by Letters Patent, is—

1. In a rake and baling-press, two sets of rakes arranged one in front of the other, the first set adapted to collect the hay and deposit it in the second set, in combination with a baling-press composed of fixed and movable sections, said movable sections adapted to open outwardly, the second set of rakes adapted to deposit hay on said outwardly-open sections of the press and means for operating the rakes and movable sections.

2. In a rake a baling-press composed of two sets of rakes arranged one in front of the other, the front set adapted to collect the hay and deposit it on the second set, in combination with a baling-press having fixed and movable sections, springs for normally holding said movable sections open, the second set of rakes being adapted to deposit the hay on the movable sections of the press and suitable means for operating the rakes and closing the said movable sections.

3. In a rake and baling-press, two sets of rakes located one in front of the other, the first set adapted to collect the hay and deposit it on the second set, in combination with a baling-press, said baling-press having fixed and movable sections, springs for normally holding said movable sections open, a projection located at one side of the outer end of the movable sections and passing through a guide-slot formed in a fixed partition, a cord attached to said projection, means for drawing said cord and closing said sections, the second set of rakes being adapted to deposit the hay on the open sections of the baling-press.

4. In a rake and baling-press, in combination with the rake and press, an axle, a driving-wheel mounted thereon, a disk located on the axle adjacent the driving-wheel, said disk having a projection located on its periphery, a dog suitably pivoted on the side of the wheel, the end of the dog adapted to engage the projection on the disk, a trip located on the framework of the machine and adapted to disengage the dog from said projection, a drum mounted on a counter-shaft, an eccentric disk attached to the first said disk, a flexible connection connecting said drum with the said eccentric disk, a cam-lever journaled on the driving-wheel of the axle adjacent said eccentric disk, a cord connecting said lever with said drum, a pivoted block attached to said lever at its outer end and a pin located on the driving-wheel and adapted at times to engage said block, the disk and the lever thus adapted to act alternately in actuating the drum in opposite directions and operate said rakes and press.

5. In a rake and baling-press, an axle, a driving-wheel mounted thereon, a disk loosely mounted on said axle, said disk having a projection on its periphery, an eccentric disk located adjacent and secured to the side of said disk, a dog pivotally connected to the side of the driving-wheel, said dog adapted to engage the projection on said disk, a trip attached to the framework of the machine and adapted to disengage the dog from the projection, a counter-shaft journaled in the framework of the machine, a drum fixed to said shaft, a flexible connection connecting said drum with the eccentric disk, a lever journaled on the axle, a pivoted block secured to the outer end of said lever, a projection located on the side of the driving-wheel and adapted at times to engage said pivoted block, a flexible connection connecting said lever with the drum, the disk and the lever thus adapted to act alternately in actuating the drum in opposite directions thereby operating the rakes and press.

6. In a rake and baling-press, a shaft journaled in the framework of the machine, a drum mounted on said shaft, an axle supported by the framework of the machine, a driving-wheel mounted on said axle, a disk having a projection on its periphery, said disk mounted on said axle, a flexible connection connecting said disk with the drum, a dog pivoted on the side of the driving-wheel and adapted to engage and disengage the projection of said disk and thereby cause the driving-wheel to operate the rake and baling-press.

7. In a rake and baling-press, an axle carried by the framework of the machine, a driving-wheel and a disk mounted on said axle, said disk having on its periphery a projection, a dog having a pivotally-attached end adapted to engage said projection and operate said disk, said dog being pivotally attached to the said driving-wheel, a spring confined at one end to the said driving-wheel and engaging at its other end the pivoted end of the dog and means for engaging said dog to cause it to disengage the projection of the disk, a flexible connection connecting said disk with the raking mechanism and adapted to operate the raking mechanism as the disk is turned.

8. In a rake and baling-press, an axle carried by the framework of the machine, a driving-wheel mounted on said axle, a disk loosely mounted on the axle, said disk having a projection on its periphery, a dog pivotally attached to the said driving-wheel, said dog being adapted to engage and disengage the projection on the disk, a link attached to the end of the dog, a trip attached to the framework of the press and adapted to engage said link and cause the dog to disengage the projection of the disk, a flexible connection connecting the disk with the raking mechanism and adapted to operate the raking mechanism as the disk is turned.

9. In a rake and baling-press, an axle carried by the framework, a driving-wheel mounted on said axle, a disk loosely mounted on said axle, said disk having a projection on its periphery, a dog pivoted to the said driving-wheel, a link connected to the end of the dog, said link passing through a perforation in the wheel at the end of the dog, a trip attached to the framework of the press and adapted to engage said link and cause the dog to disengage from the projection on the disk.

10. In a rake and baling-press, an axle carried by the framework of the machine, a disk mounted on said axle, a suitable means for engaging and disengaging said disk, and causing it to turn, an eccentric disk attached to the side of said disk, a drum supported by the framework of the machine, a flexible connection connecting the drum with the eccentric disk, the raking mechanism being connected to and operated by the drum.

11. In a rake and baling-press, an axle carried by the framework of the machine, a disk loosely mounted on said axle, a pivoted dog suitably supported, said dog adapted to engage and disengage said disk and cause it to turn, a spring normally holding the dog in close contact with the disk, a trip suitably supported and adapted at times to disengage the dog from the disk, a flexible connection connecting the disk with the raking mechanism as the disk is turned.

12. In a rake and baling-press, an axle carried by the framework of the machine, a driving-wheel journaled on said axle, a disk loosely mounted on said axle, a dog adapted to engage said disk and cause it to turn, said dog being pivotally attached to the said driving-wheel, a link attached to the end of said dog, said driving-wheel having an angular perforation, the lower end of said link passing through said perforation, a trip secured to the framework of the press and adapted to engage said link and cause it to carry the angular extension of said perforation, thereby disengaging the dog from the disk, a flexible connection connecting the disk with the raking mechanism and adapted to operate the raking mechanism as the disk is turned.

13. In a rake and baling-press, an axle carried by the framework of the machine, a driving-wheel journaled on said axle, a disk loosely mounted on said axle, a dog pivoted to the said driving-wheel, a link attached to the end of said dog, said driving-wheel having an angular perforation, the lower end of the link passing through said perforation, a spring attached at one end to the driving-wheel and bearing against said link, a trip secured at one end to the framework of the press and adapted to engage said link and cause it to enter the angular extension of the angular perforation, thereby disengaging the dog from the disk, a flexible connection connecting the disk with the raking mechanism and adapted to operate the raking mechanism as the disk is turned.

14. In a rake and baling-press, an axle carried by the framework of the machine, a driving-wheel journaled on said axle, a disk loosely mounted on said axle, a dog pivotally attached to the said driving-wheel, said driving-wheel having a slot opposite the end of the dog, a link passing through the slot and connected to the end of the dog, said driving-wheel having a second slot of angular form, said link at its lower end passing through said angular slot, a trip attached to the framework of the press and adapted to engage said link, a spring attached to the said driving-wheel and bearing against the lower end of the link, a flexible connection connecting said disk with the raking mechanism and adapted to operate the raking mechanism as the disk is turned.

15. In a rake and baling-press, an axle carried by the framework of the machine, a driving-wheel journaled on said axle, disks loosely mounted on said axle on opposite sides of the driving-wheel, dogs pivoted on opposite sides of the driving-wheel and adapted to engage and disengage said disks the driving-wheel having an elongated slot at the ends of the dogs, a link connecting the ends of the dogs through said link-slot, the driving-wheel also having an angular slot, the lower end of the link passing through said angular slot, a trip attached to the framework of the press and adapted to engage said link and cause the dogs to simultaneously disengage the disks, a flexible connection connecting the disk with the raking mechanism and adapted to operate the raking mechanism when the disk is turned.

16. In a rake and baling-press, an axle carried by the framework of the machine, a driving-wheel mounted on said axle, a lever fulcrumed on said axle, the lower end of said lever being substantially cam-shaped, a block pivoted to the upper end of said lever, said block having in its lower side a recess, a projection located on the said driving-wheel, said projection adapted to enter the lower recess of the block and carry the end of the lever around with the wheel, said block adapted to come in contact with a portion of the framework of the machine and thereby disengage the projection from the recess, a flexible connection connecting the lower end of said lever with the raking mechanism and adapted to operate the raking mechanism as the lever is moved.

17. In a rake and hay-press, an axle carried by the framework of the machine, a driving-wheel mounted on said axle, a cam-lever loosely mounted on said axle, said driving-wheel having on its side a projection, a pivoted block attached to the upper end of the cam-lever, a spring confined at one end to the lever, and at the other end to the pivoted block, said block having in its lower edge a recess, the projection of the driving-wheel adapted to enter said recess and engage the block, said block having at its upper corner a second recess, a trip on the framework of the press adapted to enter the upper recess of the block and cause the block to revolve on its pivotal point and disengage the projection of the wheel from the block, a flexible connection connecting the cam-lever with the raking mechanism and adapted to operate the raking mechanism as the lever is moved.

18. In a rake and baling-press, a drum mounted on a shaft, journaled in the framework of the machine and adapted to operate the baling-press and the rakes, a flexible connection passing over the top of said drum, a flexible connection passing under said drum and suitable means for alternately operating the upper and lower connections and thereby alternately turning the drum in opposite directions and alternately manipulating the rakes and the baling-press.

19. In a rake and baling-press, a shaft suitably journaled, a drum located on said shaft, a means for alternately turning said drum in opposite directions, a crank-arm attached to the said shaft, a plunger located in the baling-press, said crank-arm being adapted to operate the plunger of the baling-press, and a suitable means for depositing hay in the baling-press.

20. In a rake and baling-press, a shaft suitably journaled, a drum attached to said shaft, a suitable means for alternately turning said drum in opposite directions, a baling-press having opening sections, a means for closing said sections, said means consisting of a cord attached at one end to the sections, a reciprocating arm located in the framework, said cord surrounding said arm, a section located on the shaft and adapted to operate said arm.

21. In a rake and baling-press, a shaft suitably journaled, a drum attached to said shaft and means for turning said drum alternately in opposite directions, a baling-press having opening sections, a cord attached to said sections, a reciprocating arm located in the framework of the machine, said cord surrounding said arm, said arm having a downward extension, a section located on the shaft and adapted to come in contact with the downward extension of the arm and operate the same to close said sections.

22. In a rake and baling-press, a shaft suitably journaled, a drum located on said shaft, a means for turning said drum alternately in opposite directions, a baling-press having opening sections, a cord attached to said sections, a reciprocating arm located in the framework of the press, said cords surrounding said arm, a projection located on the under side of said arm, an offset formed at the end of the baling-press, said projections being adapted to engage said offset and hold the arm in its outer position, said arm having at its end a downward extension, a section located on the shaft and adapted to engage the downward extension and operate the arm, a projection located on the side of the drum and adapted to engage the downward extension of said arm and disengage the projection thereof from the offset on the baling-press.

23. In a rake and baling-press, suitably-located opening sections adapted to form portions of the sides of said baling-press, a cord attached at one end to said sections and at the other end to a stationary part of the framework of the machine, a reciprocating arm, located on the framework of the machine, said cord engaging said arm, and suitable means for reciprocating the arm and closing the sections.

24. In a rake and baling-press, a press-box located on the framework of the machine, opening sections adapted when closed to form portions of the sides of said box, a partition located behind the rear edges of said sections, said partition having curved slots, a projection located on the outer section and passing through said slot, a cord attached at one end to said projection and at the other end to a stationary part of the machine, a reciprocating arm located in the framework of the machine, said cord engaging said arm and closing the sections, and a suitable means for reciprocating the arm.

25. In a press and baling-machine, a press-box located on the framework of the machine, opening sections adapted when closed to form portions of the sides of the press-box, a partition located behind the rear edges of said sections, said partition having a curved slot, a projection located on the outer section and passing through said slot, a cord attached at one end to said projection, a pulley attached to said partition, a cord passing over said pulley, the pulley attached to the top of the press-box, said cord passing around said pulley, the other end of the cord being attached to a stationary part of the machine, a reciprocating arm located in the framework of the machine, a pulley carried by said arm, the cord passing around said pulley, and a suitable means for reciprocating the arm and closing the sections.

26. In a rake and baling-press, a press-box located on the framework of the machine, opening sections adapted when closed to form portions of the sides of the press-box, said sections being hinged together, a suitable means for closing said sections, rakes located in front of said sections and adapted to elevate hay and deposit the same on the open sections, and a suitable means for operating said rakes and baling-press.

27. In a rake and baling-press, a press-box located on the framework of the machine, opening sections adapted when closed to form portions of the sides of the press-box, said sections being hinged together, springs located on the outer sides of said sections and adapted to normally hold the sections open, a means for closing said sections, rakes located in front of said sections and adapted to elevate hay and deposit it upon the open sections, and suitable means for operating said rakes and baling-press.

28. In a rake and baling-press, a press-box located on the framework of the machine, opening sections adapted when closed to form portions of the sides of the press-box said sections being hinged together, a block located on the framework of the machine at the outer edge of the outer extended section and adapted to support the same, a suitable means for closing said sections, a suitable means located in front of said sections adapted to deposit hay on the open sections, and a means for operating the press and forming the bale.

29. In a hay rake and press, a press-box located on the framework of the machine, a reciprocating plunger adapted to operate in said box, a spring attached to said plunger and bearing at its outer end against the inner side of the top of the press-box and adapted to retain the plunger against the bottom of the press-box.

30. In a rake and baling-press, a shaft journaled in the framework of the machine, and suitable means for operating said shaft, an arm attached to said shaft, said arm having an offset, a rake-bar journaled in front of said shaft, suitable teeth attached to the rake-bar, an arm attached to said bar, the offset of the shaft-arm adapted to engage an arm of the rake-bar and operate the rake.

31. In a rake and baling-press, a shaft journaled in the framework of the machine, an arm attached to said shaft, said arm having a suitable offset, a rake-bar journaled in front of said shaft, a spring attached at one end to said rake-bar and at the other end to a stationary part of the machine, said rake-bar having suitable teeth, an arm attached to said rake-bar and adapted to engage the offset of the shaft-arm, and suitable means for operating the shaft.

32. In a rake and baling-press, a shaft suitably journaled, a rake-bar journaled in front of said shaft, said rake-bar carrying suitable teeth, an arm attached to said rake-bar, said arm having at its upper end an angular extension, an offset connected to the shaft and adapted to engage the angular extension of the rake-bar and operate the rakes, and a suitable means for operating the shaft.

33. In a rake and baling-press, a shaft suitably journaled, an arm attached to said shaft, said arm having at its end an angular extension, a pulley journaled to a stationary part of the framework of the machine, a rake-bar having a pulley, a belt passing around said pulleys, projections located on the first of the said pulleys, the extension of the shaft-bar adapted to engage said projections and operate the pulley, suitable teeth carried by the rake-bar, said teeth adapted to elevate the hay and deposit it in the press, and a suitable means for operating the shaft.

34. In a rake and baling-press, a shaft suitably journaled, an arm attached to said shaft, said arm having at its end an angular extension, a pulley journaled to a stationary part of the framework, said pulley having on its periphery projections of different lengths, the angular extension of the shaft-arm adapted to enter the space between the said projections and operate the pulley, a rake-bar having a pulley, a belt passing around said pulleys, suitable teeth carried by the rake-bar, said teeth adapted to receive and deposit the hay, and a suitable means for operating the shaft.

35. In a rake and baling-press, a shaft suitably journaled in the framework, an arm attached to said shaft, said arm having at its end an angular extension, a pulley journaled to a stationary part of the framework, projections of different lengths located on the periphery of said pulley, the shorter projection being at an incline, the angular extension of the arm adapted to enter the space between said projections and the pulley, a rake-bar, a suitable pulley, a belt-cord surrounding said pulleys, teeth attached to the rake-bar and adapted to receive and elevate the hay, and a suitable means for operating the shaft.

In testimony whereof I affix my signature in presence of two witnesses.

THOMAS CASWELL.

Witnesses:
W. K. HERRICK,
FRANK TREGO.